United States Patent [19]

Abe et al.

[11] 4,026,582

[45] May 31, 1977

[54] CONNECTED PART OF CONCRETE PIPE

[75] Inventors: Nobuyuki Abe, Tokyo; Ikuo Yanashima, Kamakura; Kenjiro Ohiwa, Urawa, all of Japan

[73] Assignee: Nippon Concrete Industries Co. Ltd., Tokyo, Japan

[22] Filed: Aug. 11, 1975

[21] Appl. No.: 603,646

[52] U.S. Cl. .............................. 285/45; 285/286; 285/288

[51] Int. Cl.² ........................................ F16L 11/12

[58] Field of Search ............ 285/288, 286, 321, 45; 138/175, 176

[56] References Cited

UNITED STATES PATENTS

| 2,001,042 | 5/1935 | Ukropina | 138/175 X |
| 2,639,731 | 5/1953 | Whiting | 138/175 X |
| 3,482,304 | 12/1969 | Brigot et al. | 285/286 X |

FOREIGN PATENTS OR APPLICATIONS 6,501,681  8/1966  Netherlands ...................... 285/288

Primary Examiner—Dave W. Arola
Attorney, Agent, or Firm—Fidelman, Wolffe & Waldron

[57] ABSTRACT

This invention relates to connected parts of a long concrete pipe made by connectng some short concrete poles or concrete piles which are separately manufactured. Especially in case that a bending moment acts on an upper part of a concrete pipe having connected parts, in order to increase the strength of the connected part against the bending moment an annular concave part is made on the outer periphery of the joined part of end plates which are fixed to reinforcements at the ends of concrete pipes, and a reinforcing split ring is inserted into the said concave part and is welded to the said end plates.

9 Claims, 13 Drawing Figures

FIG. 1(A) (PRIOR ART)
FIG. 1(B) (PRIOR ART)
FIG. 2(A) (PRIOR ART)
FIG. 2(B) (PRIOR ART)
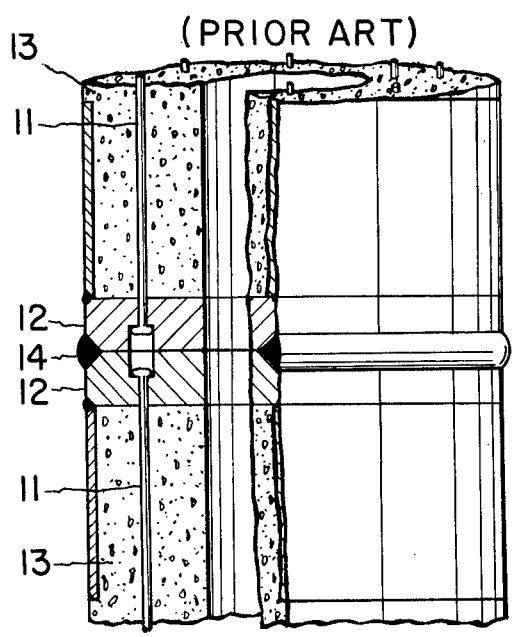
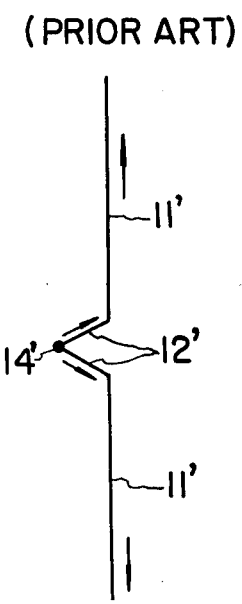
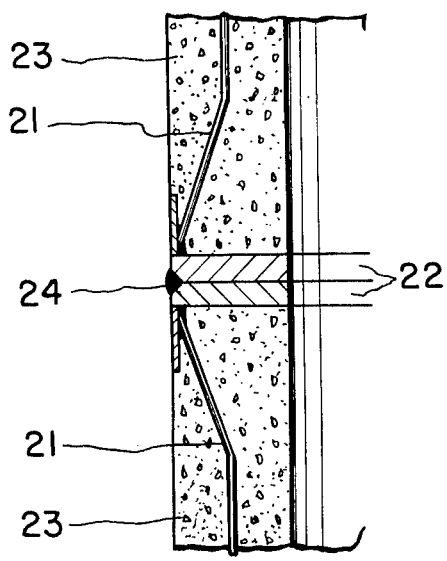
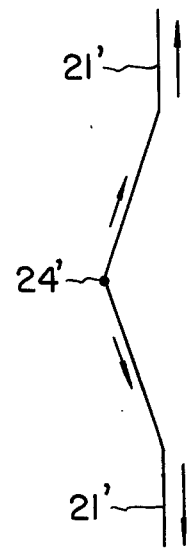

CONNECTED PART OF CONCRETE PIPE

SUMMARY OF THE INVENTION

This invention relates to a structure of a connected part of a concrete pipe.

At the present stage, for the transportation of long concrete poles and concrete piles, which lengths are for example 25 m., 30 m. or more, to executing places after their manufacture, various limitations are present. By the conditions they are manufactured in division, and after they are transported to an executing place they are connected to obtain the necessary length for execution, and thereafter the connected ones are executed. Otherwise they are connected at the time of execution.

Executed concrete pipe is given much horizontal load as well as axial load. In case a concrete pipe is used as an outside lamp post, horizontal bending load is larger than axial load. Therefore in a longer concrete pipe more sufficient strength is required against the bending moment.

In prior art of connected parts of concrete pipes structures shown in FIGS. 1 (A) and 2 (A) are general. In FIG. 1 (A) a number of reinforcements 11 are buried inside a prestressed concrete pipe 13 and fixed to end plates 12 of the concrete pipe 13 by rivet heads. Two adjacent plates 12 are pushed against each other, the outer periphery of the joined surface of the end plates is simply bevelled, and a bead weld 14 is made there.

If the upper part of the concrete pipe having the connected part of the abovementioned structure is given a clockwise bending moment, the bead weld 14 is given a load through the reinforcements 11 and the end plates 12 as shown in FIG. 1 (B). In the drawing reference numerals 11', 12' and 14' respectively designate each corresponding part on the assumption that reinforcement 11, end plate 12 and bead weld 14 are made of steel. FIG. 1 (B) shows the delivery state of the load given through the said steel parts by a convenient means. As known from the drawing, the bead weld 14 shown in the sectional view can not have sufficient strength against the clockwise bending moment given to the upper part or lower part of the concrete pipe.

FIG. 2 (A) is a sectional view showing a connected part of a reinforced concrete pipe in prior art. In this case reinforcements 21 are not tensioned and end parts thereof are bent toward the outside. The forward ends of the reinforcements 21 are welded to the outer edges of end plates 22 of concrete pipes 23. Therefore since any bending moment through the end plates 22 is not given to a bead weld 24 of the end plates 22 and 22 differently from the case shown in FIG. 1 (A), the connection is relatively strong as known from the load delivery state shown in FIG. 2 (B). However this kind of connection can not be applied to prestressed concrete pipes in which reinforcements are previously tensioned. Moreover there is a defect that wire assembling operation becomes complicated.

The present invention is to dissolve the abovementioned defects. The main object is to provide a connected part of a concrete pipe having enough strength against bending moment.

The secondary object is to provide a simple structure of the connected part having the abovementioned strength by which connection can be easily executed at a construction field.

Other object is to provide a structure by which the connected part is protected from rust and efflorescence and good appearance of the connected part is obtained.

Other objects and features of the present invention will be apparent in some embodiments described hereinafter.

BRIEF DESCRIPTION OF THE DRAWINGS

FIG. 1 (A) is a partly sectional front elevation view of a connected part of a prestressed concrete pipe in prior art;

FIG. 1 (B) is a diagram simply showing the load delivery state by a convenient means in case a clockwise bending moment is given to the upper part of the concrete pipe having the connected part shown in FIG. 1 (A);

FIG. 2 (A) is a fragmentary sectional view of a connected part of a reinforced concrete pipe in prior art;

FIG. 2 (B) is a diagram simply showing the load delivery state by a convenient means in case a clockwise bending moment is given to the upper part of the concrete pipe having the connected part shown in FIG. 2 (A);

FIG. 3 (B) is a diagram simply showing the load delivery state by a convenient means in case a clockwise bending moment is given to the upper part of the concrete pipe having the connected part of the first embodiment;

FIG. 4 (B) is a diagram simply showing the load delivery state by a convenient means in case a clockwise bending moment is given to the upper part of the concrete pipe having the connected part of the second embodiment;

FIG. 5 (B) is a diagram simply showing the load delivery state by a convenient means in case a clockwise bending moment is given to the upper part of the concrete pipe having the connected part of the third embodiment;

FIG. 6 (B) is a diagram showing the load delivery state by a convenient means in case a clockwise bending moment is given to the upper part of the concrete pipe having the connected part of the fourth embodiment.

DETAILED DESCRIPTION OF THE INVENTION

Figure 3A:
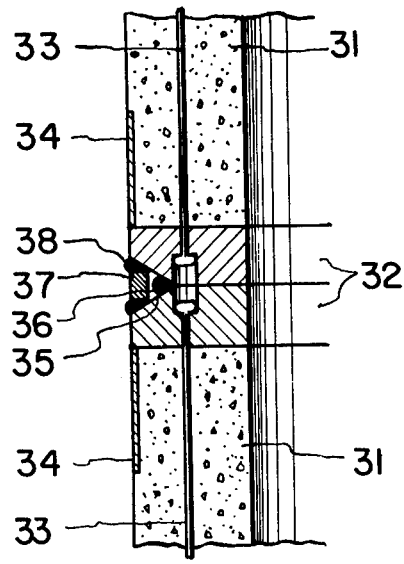
FIG. 3 (A) is a fragmentary sectional view of a connected part of a concrete pipe in the first embodiment of the present invention.
Figure 3B:
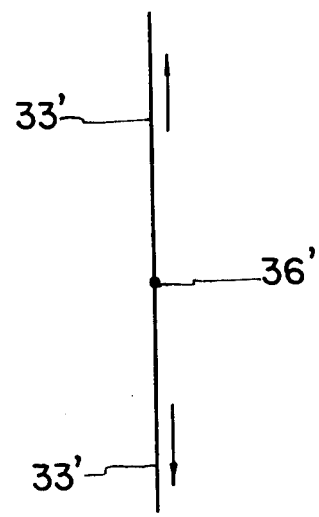

FIG. 3 (A) is a fragmentary sectional view of a connected part of a concrete pipe in the first embodiment of the present invention. Reference numeral 31 designates a concrete pipe. An end plate 32 of steel is attached to the end surface of the concrete pipe 31 and the shape of the end plate 32 is same as that of the end of the pipe 31. The said end plate 32 is fixed to the forward ends of tensioned reinforcements 33 and anchoring wires (non tensioned wires) which are not shown in the drawing buried inside the pipe 31. Reference numeral 34 designates a reinforcing steel band which is welded to the end plate 32 as one body and attached on the outer periphery of the end part of the pipe 31.

As shown in the drawing, the end plate of the pipe 31 is pushed against to that of other pipe 31 and the two adjacent pipes 31 and 31 are welded together. An annular concave part 35 is made on the outer periphery of the joined surface of the end plates 32 and 32 of the both pipes 31 and 31. The depth of the concave part 35 is about the pitch circle of the tensioned reinforcements 33. Welding is performed at the bottom of the concave part 35 so that the both end plates 32 and 32 are connected as one body. Reference numeral 36 designates a bead weld at the bottom of the concave part 35. The bead weld may be positioned at the path circle of the tensioned reinforcements 33 by making the depth of the concave part 35 deep further.

Reference numeral 37 designates a split ring made of steel which is put into the concave part 35 so as to cover the concave part 35 extending the full length. The split ring 37 is welded to the bevel surfaces of the end plates 32 and 32 and bead welds 38 and 38 are made there.

In the present embodiment the bead weld 36 which is directly welding the end plates 32 and 32 is placed at the pitch circle of the tensioned reinforcements 33 or near the pitch circle, and the bead weld 36 has an annular shape. Therefore if a clockwise bending moment acts on the upper or lower part of the connected concrete pipe, the load delivery state through the tensioned reinforcements 33 and 33 and the bead weld 36 appears on a straight line as shown in FIG. 3 (B) or on a rough straight line, and further the said load is reinforced by the split ring 37 and the bead weld 36. Thereby relatively high strength can be obtained against the bending moment given to the concrete pipe 31. Reference numerals 33' and 36' are respectively corresponding to the tensioned reinforcement 33 and the bead weld 36.

Figure 4A:
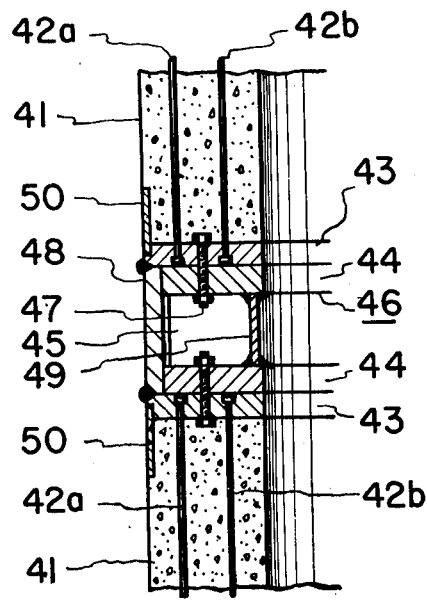
FIG. 4 (A) is a fragmentary sectional view of a connected part of a concrete pipe in the second embodiment of the present invention.
Figure 4B:
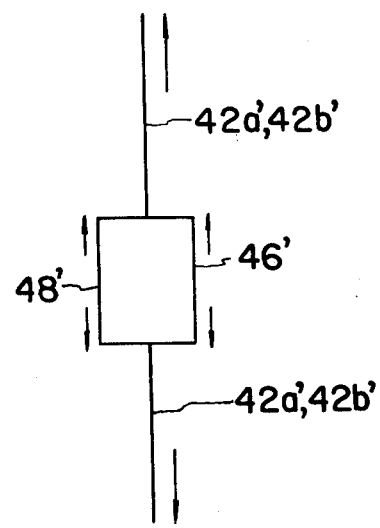

FIG. 4 (A) is a fragmentary sectional view showing a connected part in the second embodiment of the present invention. In the drawing reference numeral 41 designates a concrete pipe. Inside the concrete pipe 41 reinforcements 42a and 42b are buried. The forward ends of the reinforcements 42a and 42b are fixed to a doughnut-shape steel end plate 43. Reference numeral 46 designates a connecting metal fittings in which a cylinder 49 of a certain height is welded to the inner edges of two flanges 44 and 44 which diameter is smaller than that of the concrete pipe 41, and a number of radially arranged ribs 45 are welded to the outer edges of the flanges 44 and 44.

The said connecting metal fittings 46 is inserted between the end plates 43 and 43 of the connecting concrete pipes 41 and 41, and each flange 44 and each end plate 43 are fastened with bolts 47 at positions which are between the adjacent ribs 45 and between the reinforcements 42a and 42b. In FIG. 4 (A) the bolt 47 is protruding from the side of the concrete pipe 41 through the end plate 43 to the outside. However it is also possible that bolt holes are made on the end plate 43 from the side of the flange 44 and fastening is directly done with bolts, or that I-bolts are used.

A split ring 48 of cylinder shape which diameter is same as that of the concrete pipe 41 is attached on the outer periphery of the said connecting metal fittings 46 between the end plates 43 and 43. After all the parts of the split ring 48 are attached, they are welded as one body so as to be formed into one cylinder, and the contacting parts of the split ring 48 and the end plates 43 and 43 are welded annularly. Reference numeral 50 designates a reinforcing band attached on the outer periphery of the end part of the concrete pipe 41 as one body with the end plate 43. FIG. 4 (B) is a diagram showing the load delivery state by a convenient means in case a clockwise bending moment is given to the upper part of the concrete pipe having the connected part of the second embodiment. As shown in the drawing it can be interpreted that the end plates 43 and 43, the bolts 47 and 47, the connecting metal fittings 46 and the split ring 48 constitute one steel body at the connected part of the concrete pipes 41, and thereby the strength is increased.

Figure 5A:
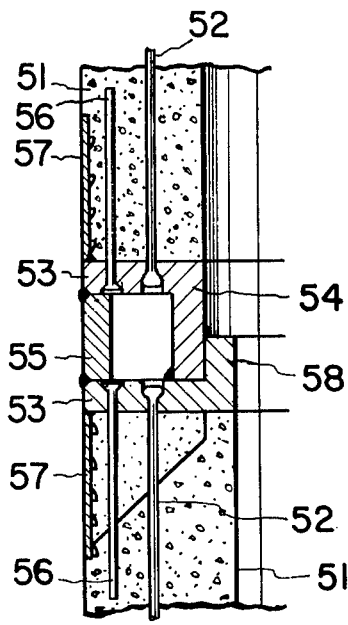
FIG. 5 (A) is a fragmentary sectional view of a connected part of a concrete pipe in the third embodiment of the present invention.
Figure 5B:
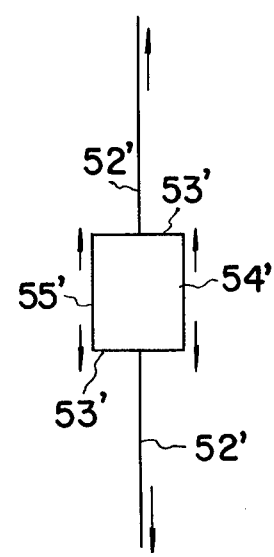

FIG. 5 (A) is a fragmentary sectional view showing a connected part in the third embodiment of the present invention. In the present embodiment a doughnut-shape end plate 53 is attached to the end surface of a concrete pipe 51 being fixed to reinforcements 52. An end plate 53 has a cylindrical downward projection 54 at the inner edge and has an angular section. Other end plate 53 has a cylindrical guide projection 58 at the inner edge which is due to contact the said downward projection 54 from the inner side. Therefore at the time of connecting the concrete pipes the said projections 54 and 58 are engaged on the same central axis.

At the time of the said engagement, since the projection 54 of one end plate is contacting the upper surface of another end plate 53, the contact corner is welded as one body. Reference numeral 55 designates a cylindrical split ring which outer diameter is same as that of the concrete pipe 51. The split ring 55 is divided into many parts and is inserted between two end plates 53 and 53 leaving a certain space by the cylindrical downward projection 54. The top and the bottom of the split ring 55 are welded to the end plates 53 and 53 as one body.

Reference numeral 56 designates anchoring wires for reinforcing the connection of the end plate 53 to the concrete pipe 51, and 57 designates a reinforcing band of a steel plate having a number of projections on the surface. The reinforcing band 57 is generally called a checker plate and is welded to the end plate 53.

Figure 6A:
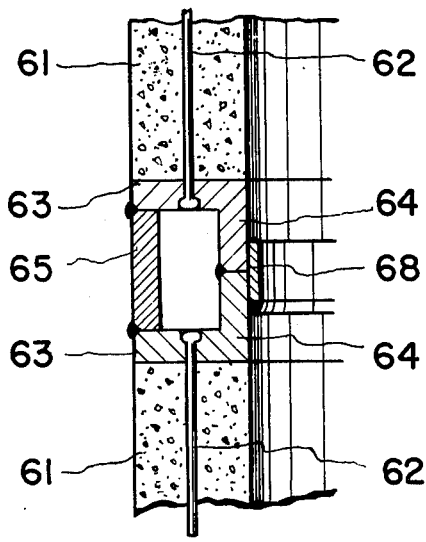
FIG. 6 (A) is a fragmentary sectional view of a connected part of a concrete pipe in the fourth embodiment of the present invention.
Figure 6B:
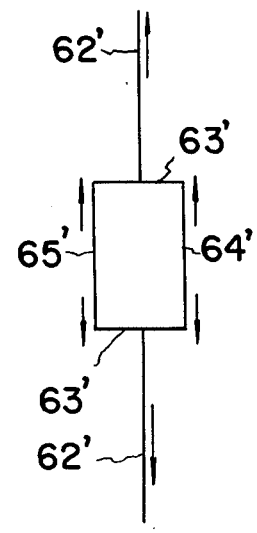

FIG. 6 (A) is a fragmentary sectional view showing a connected part in the fourth embodiment of the present invention. In the present embodiment the construction of the third embodiment is changed a little. Namely any end plate 63 fixed to reinforcements 62 at the end surface of each concrete pipe 61 has an angular section, i.e. any end plate has a cylindrical projection 64 at the inner edge and any projection 64 has same diameter so that two adjacent projections 64 can be pushed against each other. Moreover a cylindrical guide 68 is welded to the inner surface of one of the two adjacent projections 64 in the manner the guide 68 is also able to contact the inner surface of another projection 64.

In the present construction two adjacent cylindrical projections 64 are pushed against each other on the same central axis, and the outer periphery of the joined part is welded. A cylindrical split ring 65 which is divided into many parts is inserted between the end plates 63 and 63 leaving a certain space by the projections 64 and 64. The top and the bottom of the split ring 65 are welded to the end plates 63 and 63 as one body.

The load delivery states in case for example a clockwise bending moment is given to the upper parts of the concrete pipes having the connected parts in the third and fourth embodiments are respectively shown in diagrams of FIGS. 5 (B) and 6 (B) by a convenient means. As apparent from the drawings it can be interpreted that in the third and fourth embodiments one steel body consisting of end plates, cylindrical projections and a split ring is provided between each reinforcement of two connecting concrete pipes. Therefore similarly to the second embodiment relatively strong connection can be obtained.

Figure 7:
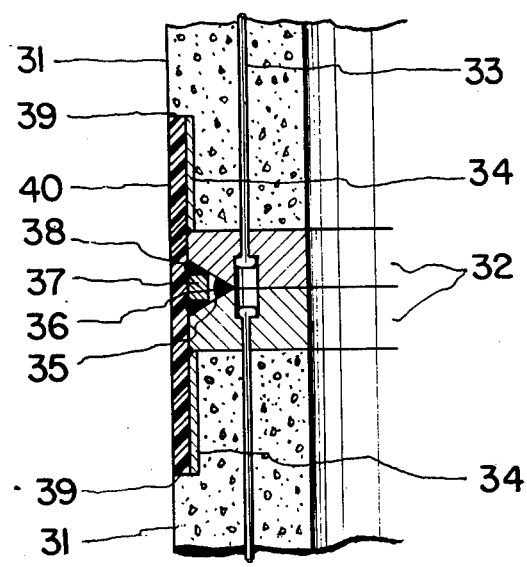
FIG. 7 is a fragmentary sectional view of the connected part of the first embodiment shown in FIG. 3 (A) in which corrosion-proof treatment is performed.

FIG. 7 is a fragmentary sectional view of the connected part of the embodiment shown in FIG. 3 (A) in which corrosion-proof treatment is performed. A wide annular concave part 39 is made by making the outer diameter of connecting end parts of the concrete pipes 31 and 31 smaller than the outer diameter of the pipe 31 by a certain dimension. A waterproof layer 40 is made by charging the said concave part 39 with synthetic resin, other watertight material, mortar or the like so that the connected part is not exposed to the outside. Instead of the waterproof layer 40 a band of synthetic resin or the like may be put.

The formation of the abovementioned waterproof layer 40 is not limited to the first embodiment, but it can be also applied to the second, third and fourth embodiments.

The waterproof layer 40 is effective to prevent the corrosion of the connected part under the ground. Moreover in case the connected part is positioned above the ground there is an advantage that good appearance is obtained.

The present invention can be applied to any of reinforced concrete pipe and prestressed concrete pipe. It is most important that even in a concrete pipe reinforced by prestress a connected part can be easily strengthened.

We claim:

1. Means for connecting sections of reinforced concrete pipe, each section having longitudinally extending reinforcing members concentrically disposed and embedded within the pipe wall and having means to fixedly attach said reinforcing members to end plates, said end plates having an inner diameter equal to the inner diameter of said pipe and having mating surfaces extending from the interior to a central portion of the pipe wall and thereafter diverging to form an annular channel, said channel comprising a bevel groove the depth of which is about equal to the depth of said reinforcing members from the outer surface of the concrete pipe, a segmented split ring fitting within said channel, said split ring and end plates welded together in axial alignment as one body.

2. Means for connecting sections of reinforced concrete pipe as claimed in claim 1 wherein said end plates conform in axial cross section to said pipe, wherein the outer diameter of said split ring conforms to the outer diameter of said pipe and wherein said end plates are directly welded together at the bottom of said groove.

3. Means for connecting sections of reinforced concrete pipe as claimed in claim 1 wherein the outer diameter of said end plates is less than the outer diameter of said pipe, said end plates further having welded thereto a reinforcing steel band extending around the outer circumference of said pipe section, the outer diameter of said band being equal to the outer diameter of said end plates, wherein the outer diameter of said split ring conforms to the outer diameter of said end plates and wherein there is provided a cylindrical band of water-tight material covering said reinforcing steel bands and said split ring, the outer diameter of said cylindrical band being approximately the same as the diameter of said pipe.

4. Means for connecting sections of reinforced concrete pipe, each section having longitudinally extending reinforcing members concentrically disposed and embedded within the pipe wall and having means to fixedly attach said reinforcing members to end plates, said end plates having an inner diameter equal to the inner diameter of said pipe, connecting metal fitting means positioned between said end plates of two adjacent concrete pipe sections, said fitting means consisting of two flanges, each having an inner diameter equal to the inner diameter of said end plates and each having an outer diameter which is smaller than that of the said end plates and a cylinder which is welded to the inner edges of the said flanges as one body, so that the outer periphery of the said connecting metal fitting means forms an annular channel between the said end plates; each flange and each end plate which are contacting each other being fastened as one body with bolts; and a segmented split ring of cylindrical shape having a height the same as that of the said connecting metal fitting means, said split ring being inserted into the said annular channel and welded to the said end plates.

5. Means for connecting sections of reinforced concrete pipe as claimed in claim 4 wherein said end plates conform in axial cross section to said pipe and wherein said end plates are attached to said pipe sections by extending said reinforcing members through matching holes in said end plates to form an attachment, said end plates further having welded thereto a reinforcing steel band extending around the outer circumference of said pipe section.

6. Means for connecting sections of reinforced concrete pipe, each section having longitudinally extending, reinforcing members concentrically disposed and embedded within the pipe wall and having means to fixedly attach said reinforcing members to end plates, each of said end plates having an inner diameter equal to the inner diameter of said pipe, one of said end plates having a first cylindrical projection of a certain height at the inner edge so as to be formed into an angular section and the other of said end plates having a second cylindrical projection at the inner edge fitting inside the said first cylindrical projection, the said two cylindrical projections engaging each other, the forward end of the first cylindrical projection being welded to the end plate having the second cylincrical projection to form one body, so that an annular channel is formed between the said end plates; and a segmented split ring of cylindrical shape having a height approximately the same as that of the said second cylindrical projection; said split ring being inserted into the said channel and welded to the said end plates.

7. Means for connecting sections of reinforced concrete pipe as claimed in claim 6 wherein said end plates conform in axial cross section to said pipe wherein the outer diameter of said split ring conforms to the outer diameter of said pipe.

8. Means for connecting sections of reinforced concrete pipe, each section having longitudinally extending reinforcing members concentrically disposed and embedded within the pipe wall and having means to fixedly attach said reinforcing members to end plates, said end plates having an inner diameter equal to the inner diameter of said pipe, each of said end plates having a cylindrical projection of the same diameter at the inner edge so as to be formed into an angular section, and the said projections mating against each other and welded together from the outside, so that an annular channel is formed between the said end plates; and a segmented split ring of cylindrical shape having a height approximately the same as that of the said welded cylindrical projections; said split ring being inserted into the said annular channel and welded to the said end plates.

9. Means for connecting sections of reinforced concrete pipe as claimed in claim 8 wherein said end plates conform in axial cross section to said pipe and wherein the outer diameter of said split ring conforms to the outer diameter of said pipe.

* * * * *